US012180917B2

(12) United States Patent
Pack et al.

(10) Patent No.: US 12,180,917 B2
(45) Date of Patent: Dec. 31, 2024

(54) HIGH TEMPERATURE NOISE AND VIBRATION ENABLER FOR COMPOSITE RESONATOR

(71) Applicant: GM Global Technology Operations LLC, Detroit, MI (US)

(72) Inventors: Seongchan Pack, West Bloomfield Township, MI (US); David Cesar Moreno, White Lake, MI (US); Shawn M. Owen, Ortonville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 383 days.

(21) Appl. No.: 17/863,938

(22) Filed: Jul. 13, 2022

(65) Prior Publication Data

US 2024/0018924 A1 Jan. 18, 2024

(51) Int. Cl.

| | |
|---|---|
| ***F02M 35/12*** | (2006.01) |
| ***F01N 1/04*** | (2006.01) |
| ***F01N 13/16*** | (2010.01) |
| ***G10K 11/165*** | (2006.01) |
| ***G10K 11/168*** | (2006.01) |

(52) U.S. Cl.

CPC .... *F02M 35/1272* (2013.01); *F02M 35/1255* (2013.01); *F02M 35/1283* (2013.01)

(58) Field of Classification Search

CPC ............... F02M 35/1272; F02M 35/12; F02M 35/1255; F02M 35/1283; F01N 13/16; F01N 1/02; F01N 1/04; G10K 11/162; G10K 11/165; G10K 11/168

See application file for complete search history.

(56) References Cited

U.S. PATENT DOCUMENTS

| | | | | |
|---|---|---|---|---|
| 6,876,796 | B2 * | 4/2005 | Garito | G02B 1/04 385/24 |
| 8,424,636 | B2 * | 4/2013 | Jones | F01N 13/1838 181/246 |
| 8,727,071 | B2 * | 5/2014 | Berker | B32B 27/40 181/292 |
| 9,976,005 | B2 * | 5/2018 | Kosonen | C08J 5/045 |
| 10,836,875 | B2 * | 11/2020 | Kia | B32B 5/30 |
| 11,492,708 | B2 * | 11/2022 | Bruton | B32B 5/24 |
| 12,033,607 | B2 * | 7/2024 | Lee | B32B 3/266 |
| 2017/0268120 | A1 * | 9/2017 | Rice | B32B 15/18 |
| 2022/0243048 | A1 * | 8/2022 | Kornacki | C08L 23/12 |
| 2022/0289638 | A1 * | 9/2022 | Kalyanaraman | C04B 35/62813 |
| 2023/0081516 | A1 * | 3/2023 | Leenders | C08J 5/10 428/297.4 |

* cited by examiner

*Primary Examiner* — Edgardo San Martin

(74) *Attorney, Agent, or Firm* — Vivacqua Crane, PLLC

(57) ABSTRACT

A composite resonator, such as for use in a vehicle air intake system, includes a fiber reinforced contacting a semi-crystalline polymer substrate. The fiber reinforced composite includes a plurality of fibers in a polymer matrix. The composite resonator further includes a particle coating contacting the fiber reinforced composite. The particle coating includes a plurality of particles deposited onto the fiber reinforced composite. In a vehicle air intake system, the composite resonator is connected to the air intake pathway. The vehicle air intake system also includes a turbocharger compressor connected to the air intake pathway.

20 Claims, 5 Drawing Sheets

HIGH TEMPERATURE NOISE AND VIBRATION ENABLER FOR COMPOSITE RESONATOR

INTRODUCTION

Resonators are used in vehicles to modulate the sound of gas, such as intake air or exhaust gas, as the gas pass through the engine system. Resonators may be positioned in the air intake or exhaust gas system. For example, an intake system resonator may be positioned between a supercharger or turbocharger and the intercooler in the air intake system. Alternatively, or additionally, a resonator may be placed between the exhaust manifold and the muffler. Resonators may be connected in-line with, or on a side-branch to the air intake or exhaust gas lines.

Intake air or exhaust gases enters the resonator in pulses and exhibits sounds of various frequencies. The sounds bounce within the resonator, altering the sound waves created by the pulses. In addition to altering the sounds, an exhaust resonator may tune the pulses of the exhaust gas to assist in removing exhaust gas from the combustion system.

Resonators are commonly formed from metal or composite materials. At relatively high operating temperatures, such as temperatures above 200 degrees Celsius, structural resonated responses may interfere with some micro-vibration from reinforced fillers. If there is a lack of thermal stability at operating temperatures, the resonator may provide less damping, reducing the performance of the resonator.

Thus, while current resonators achieve their intended purpose, there is a need for new and improved resonator composites and methods for forming the composites.

SUMMARY

According to several aspects, the present disclosure is directed to a composite resonator. The composite resonator includes a fiber reinforced composite contacting a semi-crystalline polymer substrate. The fiber reinforced composite includes a plurality of fibers in a polymer matrix. The composite resonator further includes a particle coating contacting the fiber reinforced composite. The particle coating includes a plurality of particles deposited onto the fiber reinforced composite.

In aspects of the above, the composite resonator further includes a metal casing, wherein the semi-crystalline polymer substrate is connected to the metal casing.

In any of the above aspects, the semi-crystalline polymer substrate exhibits a continuous service temperature of at least 200 degrees Celsius.

In any of the above aspects, the semi-crystalline polymer substrate exhibits a continuous service temperature of at least 200 degrees Celsius and up to 250 degrees Celsius.

In any of the above aspects, the semi-crystalline polymer substrate includes at least one of the following polymers: crystalline polyurea, polyurethane, polyarylate, polybutylene terephthalate, polyethylene terephthalate, polyethylene, epoxy, liquid crystalline polymer, polyoxymethylene, polythalidamide, polyamide, polyphenylene sulfide, polyether ether ketone, polyether ketone, copolymers thereof and blends thereof.

In any of the above aspects, the semi-crystalline polymer substrate includes a semi-crystalline polymer exhibiting a percentage of crystallinity in a range of 50 percent by weight to 90 percent by weight of the semi-crystalline polymer at a surface of the semi-crystalline polymer substrate.

In of the above aspects, the fiber reinforced composite includes the plurality of fibers in a range of 10 percent to 60 percent by weight of the total weight of the fiber reinforced composite.

In of the above aspects, at least 50 percent of the plurality of fibers are aligned in a first axis in the polymer matrix.

In of the above aspects, the plurality of fibers includes a plurality of chopped fibers exhibiting an average length in the range of 1 millimeter to 15 millimeters and an average diameter in the range of 2 micrometers to 25 micrometers.

In of the above aspects, the particle coating exhibits a thickness in a range of 2 nanometers to 200 micrometers.

In of the above aspects, the plurality of particles comprises of one or more carbon-based materials, metals, and a ceramic.

According to several aspects, the present disclosure is directed to a vehicle air intake system. The vehicle air intake system includes an air intake pathway, a turbocharger compressor connected to the air intake pathway, and a composite resonator according to any of the above aspects connected to the air intake pathway. The composite resonator includes a semi-crystalline polymer substrate, a fiber reinforced composite contacting the semi-crystalline polymer substrate, including a plurality of fibers in a polymer matrix, wherein the plurality of fibers are present in a range of 10 percent to 60 percent by weight of the total weight of the fiber reinforced composite, and a particle coating contacting the fiber reinforced composite, wherein the particle coating is formed of a plurality of particles deposited onto the fiber reinforced composite and the particle coating exhibits a thickness in a range of 2 nanometers to 200 micrometers.

In aspects of the above, the composite resonator includes a metal casing, wherein the semi-crystalline polymer substrate is connected to the metal casing.

In any of the above aspects, the semi-crystalline polymer exhibits a continuous service temperature of at least 200 degrees Celsius and up to 250 degrees Celsius.

In any of the above aspects, the semi-crystalline polymer includes at least one of the following polymers: crystalline polyurea, polyurethane, epoxy, liquid crystalline polymer, polyamide, polybutalyne terephthalate, polyethylene terephthalate, polyether ether ketone, polyphthalamide, polyarylate, polyphenylene sulfide, polyoxymethylene, copolymers thereof and blends thereof.

In any of the above aspects, the semi-crystalline polymer substrate includes a semi-crystalline polymer exhibiting a percentage of crystallinity in a range of 50 percent by weight to 90 percent by weight of the semi-crystalline polymer at a surface of the semi-crystalline polymer substrate.

In any of the above aspects, at least 50 percent of the plurality of fibers are aligned in a first axis in the polymer matrix.

In any of the above aspects, the plurality of fibers comprises a plurality of chopped fibers exhibiting an average length in the range of 1 millimeter to 15 millimeters and an average diameter in the range of 2 micrometers to 25 micrometers.

In any of the above aspects, the plurality of particles comprises of one or more carbon-based materials, metals, and a ceramic.

According to several aspects, the present disclosure relates to a method of forming a composite resonator. The method includes molding a semi-crystalline polymer substrate. The method also includes forming a fiber reinforced composite on a first surface of the semi-crystalline polymer substrate. The fiber reinforced composite includes a plurality of fibers in a polymer matrix. The method further includes depositing a particle coating, including a plurality of particles, on the fiber reinforced composite.

BRIEF DESCRIPTION OF THE DRAWINGS

The drawings described herein are for illustration purposes only and are not intended to limit the scope of the present disclosure in any way.

DETAILED DESCRIPTION

Figure 1:
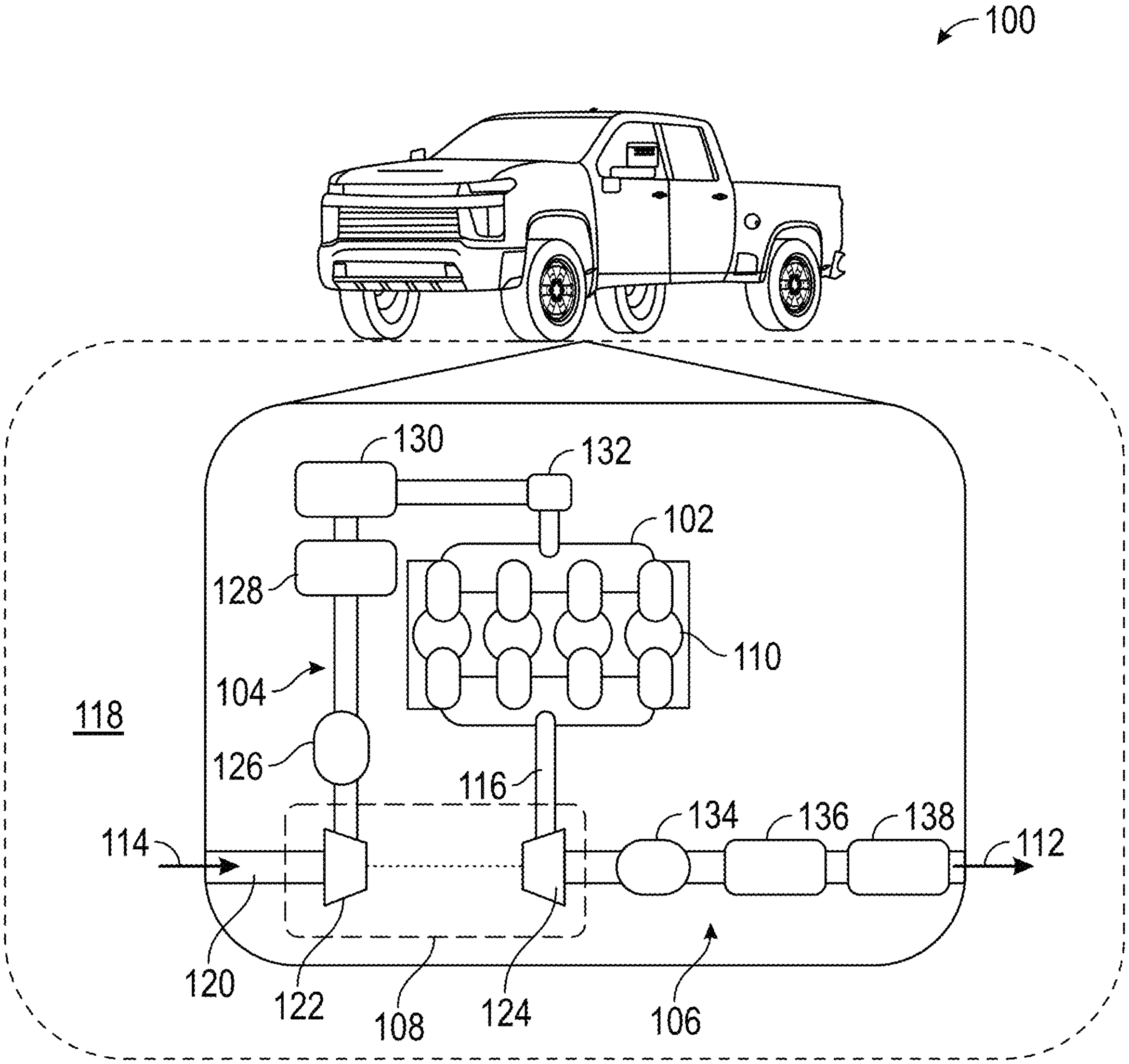
FIG. 1 illustrates a schematic diagram of an air intake system and an exhaust system in a vehicle according to an embodiment of the present disclosure.

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

FIG. 1 illustrates a vehicle 100 including an engine 102. The engine 102 includes an air intake system 104 and an exhaust system 106. Various gasses pass into the air intake system 104, through the engine 102 and exit through the exhaust system 106. In aspects, the vehicle 100 includes a turbocharger 108 coupled to both the air intake system 104 and the exhaust system 106. In further aspects, the turbocharger 108 is driven by exhaust gas 112 and forces compressed intake air 114 through the air intake system 104 and into the combustion chambers 110 of the engine 102.

In aspects, the air intake system 104 includes an air intake pathway 120. The compressor side 122 of the turbocharger 108 is connected to the air intake pathway 120 and draws air in from the atmosphere 118 into the air intake pathway 120 and compresses the intake air 114 to a pressure above atmospheric pressure. The compressed intake air 114 then passes through a composite resonator 126, an air filter 128, an intercooler 130, and through the throttle 132. In alternative aspects, the composite resonator 126, air filter 128, and intercooler 130 may be provided in a different order upstream or downstream of the other components in the system. Further, more than one composite resonator 126 may be present in the air intake pathway 120. In further aspects, a mixing valve (not illustrated) may be connected to the air intake pathway 120 to mix the compressed intake air 114 with exhaust gas 112 recirculated back to the air intake pathway 120. The composite resonator 126 is illustrated as being connected inline with the air intake pathway 120, providing a portion of the air intake pathway. Alternatively, the composite resonator 126 may be connected to the air intake pathway 120 as a branch off the air intake pathway 120. As noted above, the compressed intake air 114 enters the composite resonator 126 and the composite resonator 126 modulates the sound of the compressed intake air 114.

The exhaust system 106 includes an exhaust gas pathway 116. After combustion of a mixture of fuel and the intake air 114, exhaust gas 112 is formed and the exhaust gas 112 exits the engine 102 and passes through the driven side 124 of the turbocharger 108 to drive the compressor side 122 of the turbocharger 108. The exhaust gas 112 may then pass through a composite resonator 134, through a catalytic converter 136 and a muffler 138. Again, while the composite resonator 134 is illustrated as being connected inline with the exhaust gas pathway 116, forming a portion of the exhaust gas pathway 116, the composite resonator 134 may be connected to the exhaust gas pathway 116 as a branch off the exhaust gas pathway 116. Further, more than one composite resonator 126 may be present in the exhaust gas pathway 116. Depending on the type of engine 102, other exhaust system components may be connected to the exhaust gas pathway 116, such as a selective catalytic reduction and a diesel particular filter. In further aspects, exhaust gas recirculation loops may be provided branching from the exhaust gas pathway 116.

Figure 2A:
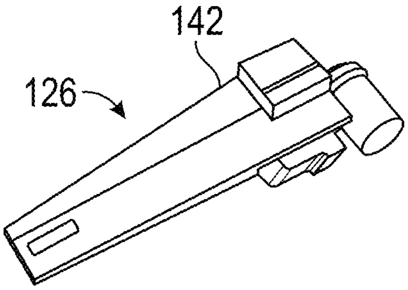
FIG. 2A illustrates a composite resonator according to an embodiment of the present disclosure.
Figure 2B:
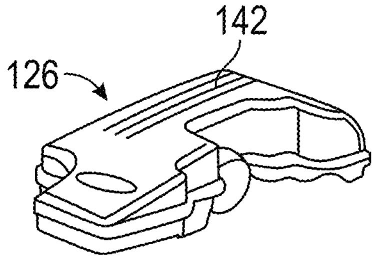
FIG. 2B illustrates a composite resonator according to an embodiment of the present disclosure.

FIGS. 2A and 2B illustrate aspects of resonators 126 that may be connected in the air intake pathway 120, including a branched composite resonator in FIG. 2A and an inline composite resonator 126 in FIG. 2B. The resonators 126 each include a noise and vibration composite 140 illustrated in FIGS. 3A, 3B, and 4. The noise and vibration composite 140 is disposed on the exterior surface of the composite resonator 126, on the interior of the composite resonator 126, or on both the exterior and interior surfaces of the composite resonator 126. In the illustrated aspects, the composite resonator 126 is encased in casing 142 formed of plastic; however, in alternative aspects, the composite resonator 126 is encased in metal, such as stainless steel or aluminum, plastic, or a combination thereof. In aspects, the casing 142 is one or more of the following: heat shielding, an impact housing, and an electromatic house. It should be appreciated, however, that depending on the application, the casing 142 may not be present and the composite resonator 126 includes only the noise and vibration composite 140.

Figure 3A:
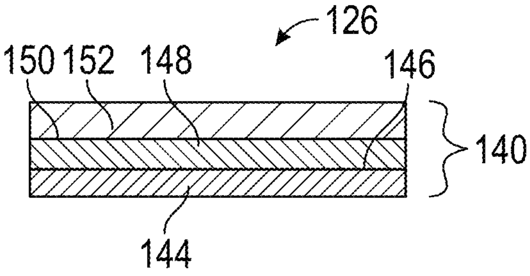
FIG. 3A illustrates a noise and vibration composite of a composite resonator according to an embodiment of the present disclosure.
Figure 3B:
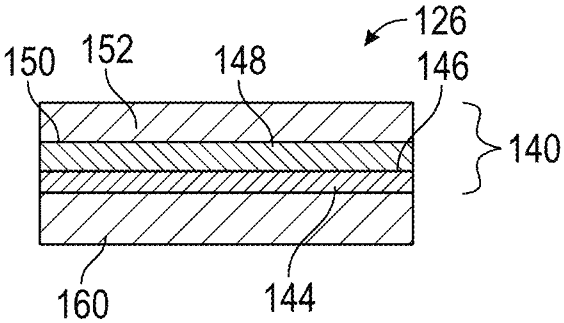
FIG. 3B illustrates a noise and vibration composite disposed on a component of a composite resonator according to an embodiment of the present disclosure.
Figure 4:
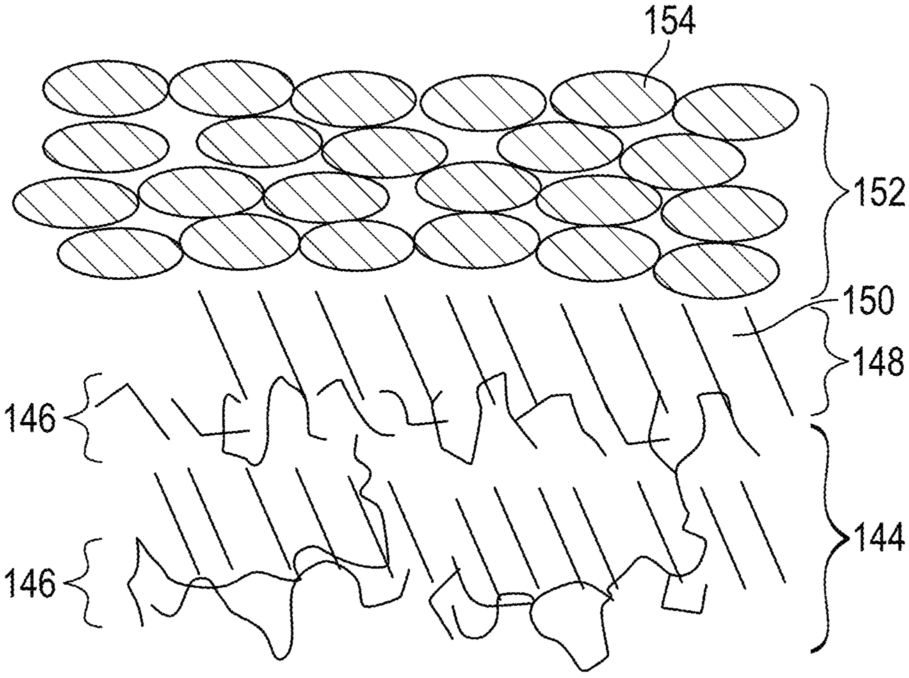
FIG. 4 is a close-up schematic illustration of a composite resonator according to an embodiment of the present disclosure.

Referring now to FIGS. 3A, 3B, and 4, a first layer of the noise and vibration composite 140 is a semi-crystalline polymer substrate 144. The semi-crystalline polymer substrate 144 includes a polymer material that is formed of a semi-crystalline polymer. In aspects, the semi-crystalline polymer substrate 144 exhibits a thickness in the range of 0.1 millimeters to 3 millimeters, including all values and ranges therein. The semi-crystalline polymer exhibits a relatively high percentage of crystallinity, i.e., crystalline structures, by weight at the surface 146 up to a depth of two percent of the thickness of the of the semi-crystalline polymer substrate 144 (as illustrated, both surfaces 146 includes a relatively high percentage of crystallinity) from the surface 146, and in aspects, throughout the thickness of the semi-crystalline polymer substrate 144. The percentage of crystallinity is greater than 40 percent and up to 90 percent by weight of the semi-crystalline polymer, and in further aspects, from 50 percent to 90 percent. In addition, the semi-crystalline polymer forming the semi-crystalline polymer substrate 144 exhibits a minimum continuous service temperature, or a heat deflection temperature, of at least 200 degrees Celsius and up to 250 degrees Celsius, including all values and ranges therein, measured by ASTM D648-18. Thermal stability at elevated temperatures prevents a loss in the damping characteristics of the material as well as preventing loss of structural strength and flexibility. In aspects, the substrate 144 exhibits a thickness in the range of 0.1 millimeters to 3 millimeters, including all values and ranges therein. The semi-crystalline polymer substrate 144 includes, for example, one or more of the following polymers: crystalline polyurea, polyarylate, polybutylene terephthalate, polyethylene terephthalate, polyurethane, polyethylene, epoxy, liquid crystalline polymer, polyoxymethylene, polythalidamide, polyamide, polyphenylene sulfide, polyether ether ketone, polyether ketone, copolymers thereof and blends thereof, as well as copolymers or blends thereof. Alteration of the degree of crystallinity alters the damping response and transmission loss. In addition, the density of the crystalline structures may affect the resonated response and act as a polarizer to attenuate the resonated response. FIG. 3B illustrates aspects where the semi-crystalline polymer substrate 144 is formed on a component 160, such as the casings 142 illustrated in FIGS. 2A and 2B. Again, the component 160 may be formed from a plastic, ceramic, metal, or a combination thereof.

Figure 5A:
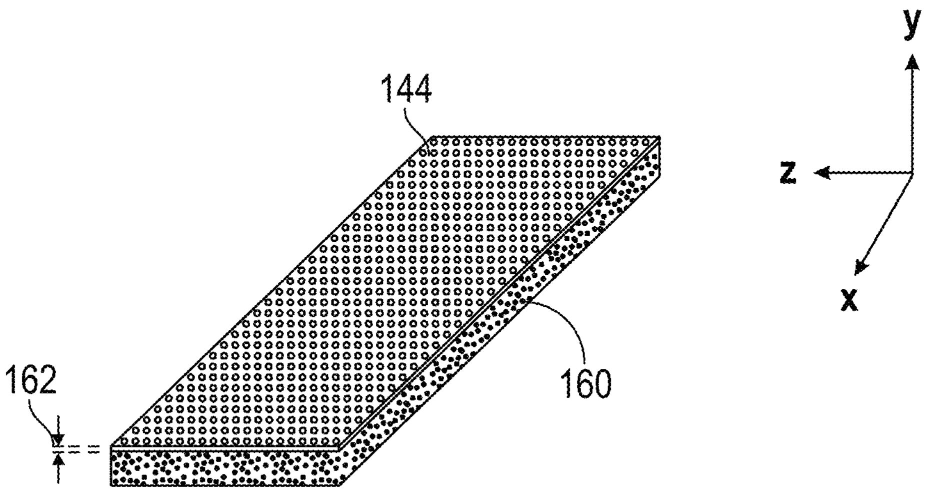
FIG. 5A illustrates a semi-crystalline polymer substrate according to an embodiment of the present disclosure.
Figure 5B:
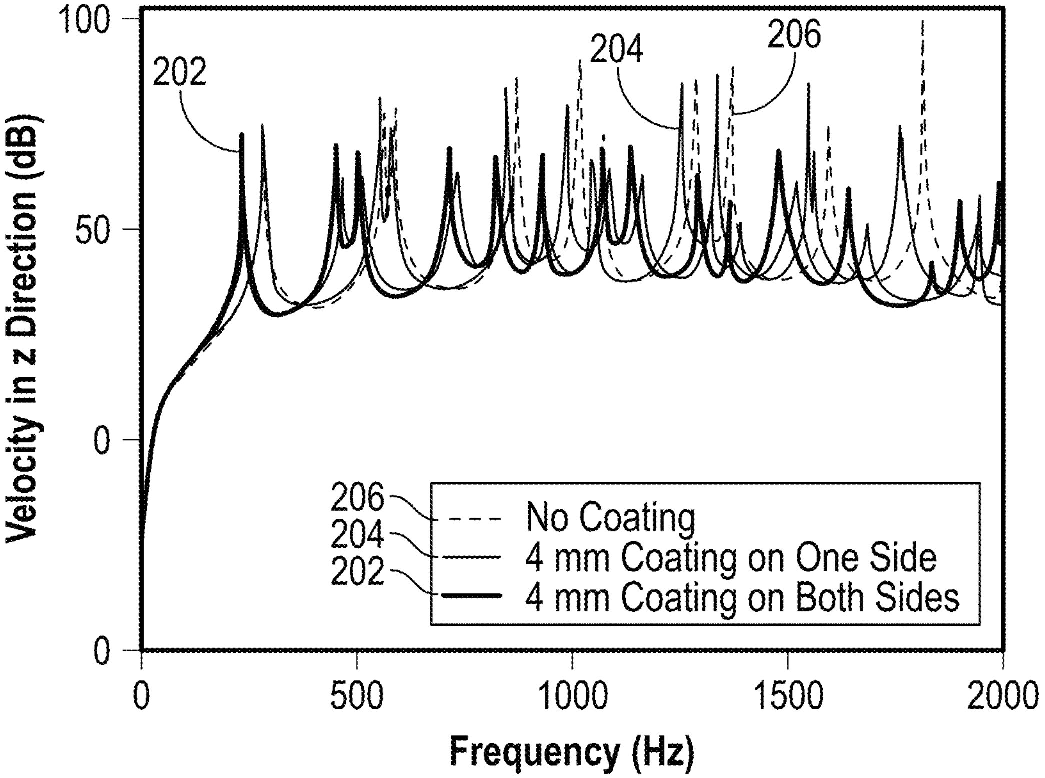
FIG. 5B is a graph illustrating the effect of a semi-crystalline polymer substrate on damping.

Reference is made to FIGS. 5A and 5B, which provide an illustrative example of the effect of the use of a polyurea semi-crystalline substrate 144 applied to a component 160. FIG. 5A illustrates a metal component 160 coated on one side with a semi-crystalline polyurea polymer substrate 144. FIG. 5B illustrates the effect of the coating on damping of noise at frequencies in the range of 0 Hz to 2000 Hz as determined by finite element analysis. When the polyurea semi-crystalline substrate 144 is not present, illustrated by line 206, the resonated response of the component 160 is relatively higher in the mid-range from about 800 to 1300 Hz and significantly higher in the upper range around 1750 Hz. When the polyurea semi-crystalline substrate 144 is coated on one surface of the component 160, such as the inside of the component, illustrated by line 204, the attenuated response is damped in the mid-range and upper range, demonstrating a degree of damping. When the polyurea semi-crystalline substrate 144 is coated on both sides of the component 160, such as both the inside and outside of the component 160, illustrated by line 202, the attenuated response is damped in the mid-range and upper range, demonstrating a degree of damping of approximately 30 to 40 dB from approximately 450 Hz to 2000 Hz.

Figure 6A:
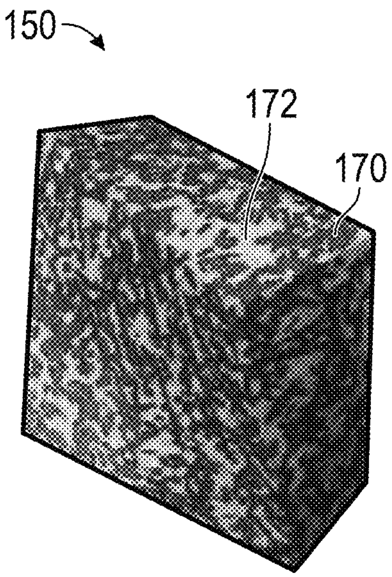
FIG. 6A illustrates a schematic of a fiber composite matrix according to an embodiment of the present disclosure.
Figure 6B:
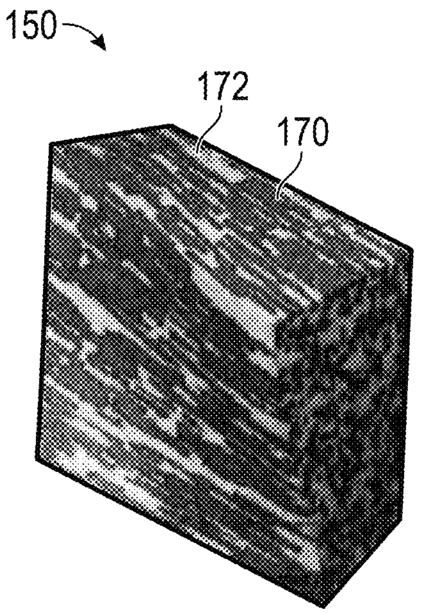
FIG. 6B illustrates a schematic of a fiber composite matrix according to an embodiment of the present disclosure.

A second layer of the noise and vibration composite 140, illustrated in FIGS. 6A and 6B, includes a fiber reinforced composite 148 contacting the semi-crystalline polymer substrate 144 at the surface 146 of the semi-crystalline polymer substrate 144 as illustrated in FIGS. 3A and 3B. In aspects, the fiber reinforced composite 148 is 1 millimeter to 2 millimeters in thickness, including all values and ranges therein. In FIG. 6A, the fibers 170 are randomly oriented in the polymer matrix 172. In FIG. 6B, of the fibers 170 are aligned in a first axis, the x-axis as illustrated, wherein the length of the fibers 170 run in the x direction perpendicular to a second axis, the y-axis as illustrated, within the polymer matrix 172. While reference is made to x, y and z axis, it should be appreciated that the fibers 170 may be oriented, in the direction of length, in any given axis, x, y or z. Fiber alignment may be used to provide a directional response, and damping, to sound while maintaining structural integrity at continuous and elevated service temperatures.

In aspects, the fibers are chopped fibers exhibiting an average diameter in the range of 2 micrometers to 25 micrometers, including all values and ranges therein, and an average length in the range of 1 millimeter to 15 millimeters, including all values and ranges therein. In further aspects, the fibers 170 include one or more of the following materials: glass, ceramic, carbon, para-aramid fiber (KEVLAR®), meta-aramid fiber (NOMEX®), and combinations thereof.

A polymer matrix 172 is combined with the fibers 170 to form the fiber reinforced composite 148, wherein the fibers 170 are dispersed in the polymer matrix 172. The polymer matrix 172 includes a polymer of either thermosets or thermoplastic materials such as one of: polyester, polycarbonate, polypropylene, polyamide, epoxy, polyetherimide and polyetherether ketone. The fibers 170 are present in the polymer matrix 172 in the range of 10 percent to 60 percent, including all values and ranges therein, by weight of the total weight of the fiber reinforced composite 148.

With increasing loading of fiber 170 in the polymer matrix 172, the frequency of sound, applied at a broad range of frequencies from 100 Hz to 2000 Hz, is shifted to higher frequencies. Further, with an increase in fiber 170 orientation in a given axis, such as the x-axis, the frequency of sound, applied at a broad range of frequencies from 100 Hz to 2000 Hz, is shifted to higher frequencies, as compared to randomly oriented fibers 170 present at the same loading in the polymer matrix 172. In aspects, at least 10 percent of the fibers 170 are oriented in a first axis, (as illustrated, the x direction in the x, y-plane), including all values and ranges from 10 percent to 70 percent, including at least 50 percent. Directional resonated responses may be obtained with fiber content and fiber alignment. In addition, the presence of fibers 170 in the fiber reinforced composite 148 assists in maintaining the structural integrity of the composite resonator 126.

Reference is made to Table 1, below, including an illustrative example of the effect of fiber loading and direction in the polymer matrix 172 on frequency shift. The frequencies shifts were determined using finite element analysis.

TABLE 1

Effect of Fiber Loading and Orientation on Frequency

| Frequency Mode | 0% Loading Frequency (Hz) | 10% Fiber random orientation Frequency (Hz) | 50% Fiber random orientation Frequency (Hz) | 50% Fiber oriented in x-axis Frequency (Hz) |
|---|---|---|---|---|
| Mode 1 | 100.93 | 124.67 | 202.45 | 267.74 |
| Mode 2 | 202.14 | 202.14 | 406.03 | 536.99 |

TABLE 1-continued

Effect of Fiber Loading and Orientation on Frequency

| Frequency Mode | 0% Loading Frequency (Hz) | 10% Fiber random orientation Frequency (Hz) | 50% Fiber random orientation Frequency (Hz) | 50% Fiber oriented in x-axis Frequency (Hz) |
|---|---|---|---|---|
| Mode 3 | 210.94 | 210.94 | 425.34 | 562.52 |
| Mode 4 | 309.85 | 309.85 | 623.32 | 824.36 |
| Mode 5 | 360.02 | 360.02 | 725.03 | 958.88 |
| Mode 6 | 378.14 | 467.57 | 763.32 | 1009.5 |

As seen in the table above, in each mode, fibers 170 present at 10 percent by weight in the fiber reinforced composite 178 shifted the responded frequencies higher by an average of 24 percent. Fibers 170 present at of 50 percent by weight (seen in FIG. 6A) in the fiber reinforced composite 178 shifted the frequency higher by an average of 101 percent in each mode tested. Fibers 170 present at of 50 percent by weight and oriented in the x-axis (seen in FIG. 6B) in the fiber reinforced composite 178 shifted the frequency higher by an average of 115 percent in each mode tested.

The third layer of the noise and vibration composite 140 includes a particle coating layer 152 formed from a plurality of particles disposed on the surface 150 of the fiber reinforced composite 148. The particle coating layer is in the range of 0.1 millimeters in thickness to 5 millimeters in thickness, including all values and ranges therein. Further, the diameter of the discrete particles in the particle coating layer 152 are in a range of 2 nanometers to 200 micrometers, including all values and ranges therein. Further, the coating exhibits a degree of porosity, wherein the coating exhibits a percentage density in the range of 10 to 50, including all values and ranges therein, of the density of a solid coating of the same material. Increasing particle coating layers increases the damping and transmission loss. The porosity of the individual particles 154 and thermal conductivity of the materials used to form the particles may provide heat shielding and dissipation of the resonated responses.

The particle coating layer 152 comprises of one or more: carbon-based materials, such as carbon nanotubes or graphene; metals such as transition metals, basic metals, metalloids and alloys thereof; a ceramic including a combination of metals and non-metals; and polymers including thermally conductive polymers or electrically conductive polymers. A thermally or electrically conductive polymer is understood as a polymer that includes an additive that conducts heat or dissipates electricity, respectively. Heat conductive polymers include one or more of the following thermally conductive fillers: graphene, metal and metal alloy. Electrically conductive polymers include one or more of the following electrically conductive fillers: carbon fibers, carbon nanotubes, graphene, graphite, metal, and metal alloys.

Figure 7A:
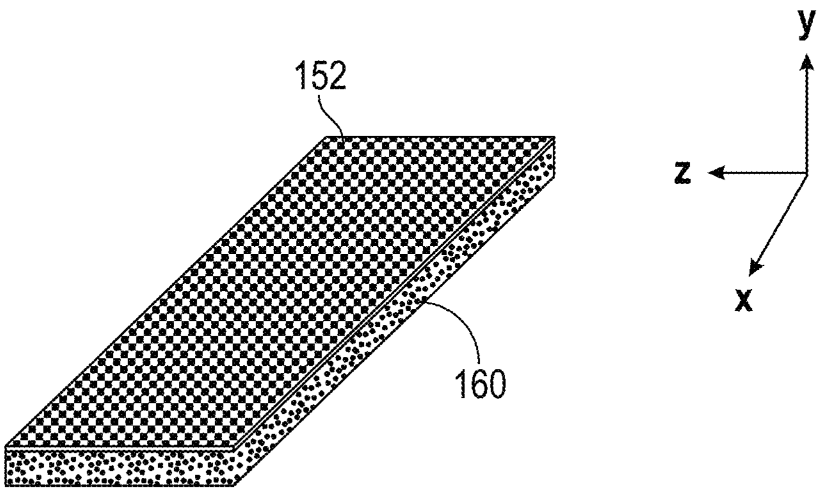
FIG. 7A illustrates a schematic of a particle coating according to an embodiment of the present disclosure.
Figure 7B:
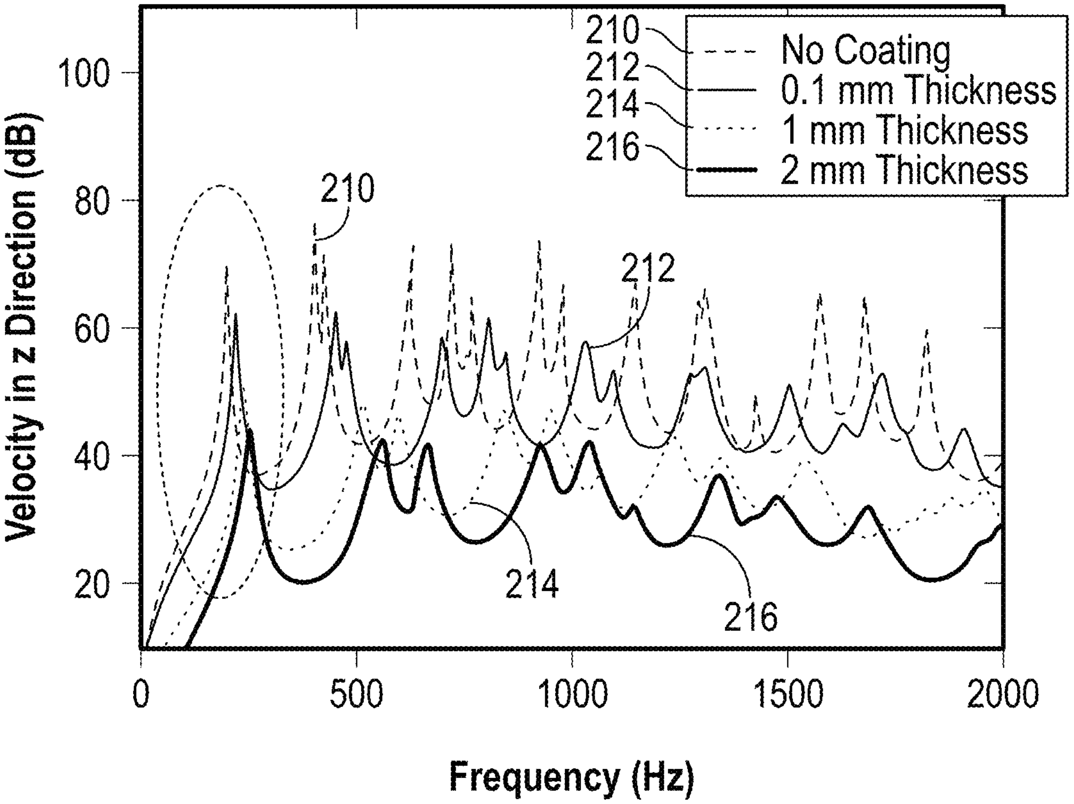
FIG. 7B illustrates a graph illustrating the effect of particle coating thickness on damping.

Reference is made to FIGS. 7A and 7B, which provide an illustrative example of the effect of the use of a particle coating layer 152 applied to a component 160. FIG. 7A illustrates a particle coating layer 152 deposited on an underlying component 160, which in this example may be one of a metal, plastic, or ceramic and exhibits a thickness in the range of 1 millimeter to 3 millimeters. FIG. 7B illustrates the effect of adding the particle coating layer 152 to an underlying component 160 on damping of noise at frequencies in the range between 0 to 2000 Hz as determined by finite element analysis. When the particle coating layer 152 is not present, illustrated by line 210, the resonated response of the component 160 is relatively higher across the entire frequency range between 0 to 2000 Hz as compared to the samples measured with the particle coating layer 152. As the thickness of the particle coating layer 152 increases from 0.1 millimeters to 1 millimeter to 2 millimeters in thickness, the resonated response is attenuated, and the frequencies shifted to higher frequencies, across frequencies in the range between 0 Hz to 2000 Hz. Thirty to forty decibel reductions are exhibited at frequencies in a range between 0 Hz to 2000 Hz.

Figure 8:
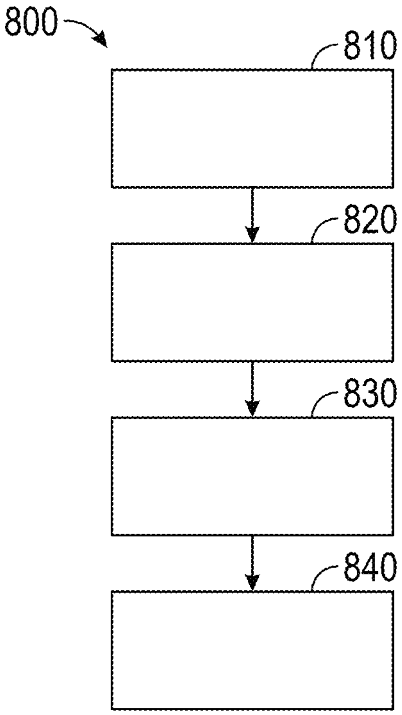
FIG. 8 illustrates a method of forming a composite resonator.

A method 800 of forming the noise and vibration composite 140 of the composite resonator 126 is illustrated in FIG. 8. At block 810 with forming the semi-crystalline polymer substrate 144 of the noise and vibration composite 140. The semi-crystalline polymer substrate 144 is molded using one or more of a variety of polymer forming processes including coating, injection molding, compression molding, extrusion, vacuum forming, blow molding, additive manufacturing including 3D printing, etc. If the composite resonator 126 is provided in combination with another component, such as a metal casing 142, semi-crystalline polymer substrate 144 may be assembled with the other component or molded directly onto the other component using processes such as compression molding, injection molding, etc.

At block 820 the fiber reinforced composite 148 is applied to the semi-crystalline polymer substrate 144. In aspects, the fiber reinforced composite 148 is formed by resin transfer molding, compression transfer molding, injection molding, additive manufacturing including 3D printing, etc., wherein the fibers 170 are disposed on the surface 146 of the semi-crystalline polymer substrate 144 and then the polymer, providing the polymer matrix 172, is impregnated into the fibers 170 under pressure in a mold cavity. In other aspects, the fibers 170 are introduced with the polymer matrix 172 material into a mold cavity onto the semi-crystalline polymer substrate 144.

At block 830, the particle coating layer 152 is formed on the surface 150 of the fiber reinforced composite. The particles 154 and particle coating layer 152 may be formed by one or more of several processes including vapor deposition, such as physical vapor deposition or chemical vapor deposition, and thermal spray, such as atmospheric plasma spray, additive manufacturing such as multi jet fusion, etc.

At block 840, if the composite resonator 126 has not been molded onto another component, such as metal casing 142, the composite resonator 126 may be assembled to the other component. It should also be appreciated that, alternatively, the assembly of the composite resonator 126 to another component, such as metal casing 142, may occur between block 810 and 820, or between 820 and 830 and block 840 may occur after blocks 810 and 820.

As illustrated, the noise and vibration composite 140 is formed on metal casing 142 to provide a composite resonator 126. In other aspects, the composite resonator 126 is formed from the noise and vibration composite 140 without an additional component, such as the metal casing 142. In addition, the composite resonator 126 may assume a number of shapes, such as a hollow body having a continuous cross-section, assuming the shape of hollow cylinders, or variable cross-sections. Further, while it is noted herein that the composite resonator 126 is provided for use in a vehicle 100, the composite resonator 126 may be deployed within an appliance, an airplane, a locomotive, a generator, or other device that may generate sound through the movement of a gasses.

Resonators including noise and vibration composites of the present disclosure offer several advantages. These advantages may include, for example, providing a composite resonator with heat shielding that exhibits thermal stability at continuous service temperatures of up to 250 degrees Celsius, such as found in air intake and exhaust gas systems. Thermal stability at elevated temperatures prevents a loss in the damping characteristics of the material as well as preventing loss of structural strength and flexibility. Further advantages of the composite resonator of the present disclosure include the ability to vary the resonated response frequencies of each layer, i.e., the semi-crystalline polymer substrate, the fiber reinforced composite, and the particle coating layer based on desired response outcomes, even at continuous service temperatures. Yet further advantages include improved performance during design verification and production validation that provides enhanced durability during global engine development thermal cycling tests as well as improved part performance and functionality in the field.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A composite resonator, comprising:

a semi-crystalline polymer substrate;

a fiber reinforced composite contacting the semi-crystalline polymer substrate, wherein the fiber reinforced composite includes a plurality of fibers in a polymer matrix; and a particle coating contacting the fiber reinforced composite, wherein the particle coating includes a plurality of particles deposited onto the fiber reinforced composite.

2. The composite resonator of claim 1, further comprising a metal casing, wherein the semi-crystalline polymer substrate is connected to the metal casing.

3. The composite resonator of claim 1, wherein the semi-crystalline polymer substrate exhibits a continuous service temperature of at least 200 degrees Celsius.

4. The composite resonator of claim 3, wherein the semi-crystalline polymer substrate exhibits a continuous service temperature of at least 200 degrees Celsius and up to 250 degrees Celsius.

5. The composite resonator of claim 4, wherein the semi-crystalline polymer substrate includes at least one of the following polymers: crystalline polyurea, polyurethane, polyarylate, polybutylene terephthalate, polyethylene terephthalate, polyethylene, epoxy, liquid crystalline polymer, polyoxymethylene, polythalidamide, polyamide, polyphenylene sulfide, polyether ether ketone, polyether ketone, copolymers thereof and blends thereof.

6. The composite resonator of claim 5, wherein the semi-crystalline polymer substrate includes a semi-crystalline polymer exhibiting a percentage of crystallinity in a range of 50 percent by weight to 90 percent by weight of the semi-crystalline polymer at a surface of the semi-crystalline polymer substrate.

7. The composite resonator of claim 5, wherein the fiber reinforced composite includes the plurality of fibers in a range of 10 percent to 60 percent by weight of the total weight of the fiber reinforced composite.

8. The composite resonator of claim 7, wherein at least 50 percent of the plurality of fibers are aligned in a first axis in the polymer matrix.

9. The composite resonator of claim 8, wherein the plurality of fibers comprises a plurality of chopped fibers exhibiting an average length in the range of 1 millimeter to 15 millimeters and an average diameter in the range of 2 micrometers to 25 micrometers.

10. The composite resonator of claim 8, wherein the particle coating exhibits a thickness in a range of 2 nanometers to 200 micrometers.

11. The composite resonator of claim 10, wherein the plurality of particles comprises of one or more carbon-based materials, metals, and a ceramic.

12. A vehicle air intake system, comprising:

an air intake pathway;

a turbocharger compressor connected to the air intake pathway; and a composite resonator connected to the air intake pathway, wherein the composite resonator includes:

a semi-crystalline polymer substrate, a fiber reinforced composite contacting the semi-crystalline polymer substrate, including a plurality of fibers in a polymer matrix, wherein the plurality of fibers is present in a range of 10 percent to 60 percent by weight of the total weight of the fiber reinforced composite, and a particle coating contacting the fiber reinforced composite, wherein the particle coating is formed of a plurality of particles deposited onto the fiber reinforced composite and the particle coating exhibits a thickness in a range of 2 nanometers to 200 micrometers.

13. The vehicle air intake system of claim 12, further comprising a metal casing, wherein the semi-crystalline polymer substrate is connected to the metal casing.

14. The vehicle air intake system of claim 12, wherein the semi-crystalline polymer substrate exhibits a continuous service temperature of at least 200 degrees Celsius and up to 250 degrees Celsius.

15. The vehicle air intake system of claim 14, wherein the semi-crystalline polymer substrate includes at least one of the following polymers: crystalline polyurea, polyurethane, polyarylate, polybutylene terephthalate, polyethylene terephthalate, polyethylene, epoxy, liquid crystalline polymer, polyoxymethylene, polythalidamide, polyamide, polyphenylene sulfide, polyether ether ketone, polyether ketone, copolymers thereof and blends thereof.

16. The vehicle air intake system of claim 15, wherein the semi-crystalline polymer substrate includes a semi-crystalline polymer exhibiting a percentage of crystallinity in a range of percent by weight to 90 percent by weight of the semi-crystalline polymer at a surface of the semi-crystalline polymer substrate.

17. The vehicle air intake system of claim 15, wherein at least 50 percent of the plurality of fibers are aligned in a first axis in the polymer matrix.

18. The vehicle air intake system of claim 17, wherein the plurality of fibers comprises a plurality of chopped fibers exhibiting an average length in the range of 1 millimeter to 15 millimeters and an average diameter in the range of 2 micrometers to 25 micrometers.

19. The vehicle air intake system of claim 18, wherein the plurality of particles comprises of one or more carbon-based materials, metals, and a ceramic.

20. A method of forming a composite resonator, comprising:

molding a semi-crystalline polymer substrate, wherein the semi-crystalline polymer substrate includes a first surface;

forming a fiber reinforced composite on the first surface of the semi-crystalline polymer substrate, wherein the fiber reinforced composite includes a plurality of fibers in a polymer matrix; and depositing a particle coating on the fiber reinforced composite, wherein the particle coating includes a plurality of particles.

* * * * *